United States Patent
Belin et al.

(10) Patent No.: US 10,378,148 B2
(45) Date of Patent: Aug. 13, 2019

(54) CABLE GUMMED IN SITU AND CONTAINING A GUMMING COMPOSITION THAT CONTAINS A CORROSION INHIBITOR

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Lionel Belin, Clermont-Ferrand (FR); Nathalie Salgues, Clermont-Ferrand (FR); Sébastien Noel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 415 days.

(21) Appl. No.: 15/317,629

(22) PCT Filed: Jun. 11, 2015

(86) PCT No.: PCT/EP2015/063017
§ 371 (c)(1),
(2) Date: Dec. 9, 2016

(87) PCT Pub. No.: WO2015/189313
PCT Pub. Date: Dec. 17, 2015

(65) Prior Publication Data
US 2017/0107663 A1 Apr. 20, 2017

(30) Foreign Application Priority Data
Jun. 12, 2014 (FR) ..................... 14 55343

(51) Int. Cl.
*B60C 1/00* (2006.01)
*D07B 1/06* (2006.01)
(Continued)

(52) U.S. Cl.
CPC ............ *D07B 1/062* (2013.01); *B60C 9/0007* (2013.01); *C08K 5/17* (2013.01); *C08K 5/5317* (2013.01);
(Continued)

(58) Field of Classification Search
CPC ......... B60C 1/00; B60C 9/007; B60C 9/0021; D07B 1/068; D07B 2201/2009;
(Continued)

(56) References Cited

U.S. PATENT DOCUMENTS 5,139,874 A 8/1992 Starinshak
5,461,850 A * 10/1995 Bruyneel .............. D07B 1/0613
57/212

(Continued)

FOREIGN PATENT DOCUMENTS

JP 05177772 7/1993
JP 2011-174100 9/2011
(Continued)

OTHER PUBLICATIONS

Boyapati et al., "Surface Analysis of Carbon Steel Protected from Corrosion by a New Ternary Inhibitor Formulation Containing Phosphonated Glycine, $Zn^{2+}$ and Citrate", Journal of Surface Engineered Materials and Advanced Technology, vol. 3, No. 1, Jan. 1, 2013, pp. 28-42.
(Continued)

*Primary Examiner* — Tajash D Patel
(74) *Attorney, Agent, or Firm* — Cozen O'Connor

(57) ABSTRACT

A cord rubberized in situ (C). Internal layer of the cord (CT1) comprises N1 internal thread(s). External layer of the
(Continued)

cord (CT3) comprises N3 external threads wound helically around the internal layer of the cord. Rubber composition (20) is positioned between the internal layer of the cord and the external layer of the cord, and comprises a compound of formula (I) or a salt of this compound:

(I)

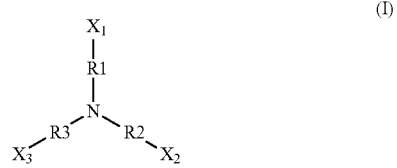

in which: each R1, R2 and R3 group represents, independently of one another, an alkylene, arylene, arylalkylene, alkylarylene or cycloalkylene group, each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and $X_3$ comprises at least one —COOH, —CO—NH—OH, —SOOH, —PO(OR)(R') or —PO(OR)(OR') group with R and R' representing, independently of each other, hydrogen or an alkyl group.

25 Claims, 8 Drawing Sheets

(51) Int. Cl.
*C08K 5/17* (2006.01)
*D07B 1/16* (2006.01)
*B60C 9/00* (2006.01)
*C08K 5/5317* (2006.01)

(52) U.S. Cl.
CPC ......... *D07B 1/0613* (2013.01); *D07B 1/0626* (2013.01); *D07B 1/0633* (2013.01); *D07B 1/0646* (2013.01); *D07B 1/165* (2013.01); *B60C 2009/0021* (2013.01); *D07B 2201/2002* (2013.01); *D07B 2201/208* (2013.01); *D07B 2201/2046* (2013.01); *D07B 2201/2061* (2013.01); *D07B 2201/2062* (2013.01); *D07B 2201/2065* (2013.01); *D07B 2201/2077* (2013.01); *D07B 2201/2081* (2013.01); *D07B 2201/2082* (2013.01); *D07B 2201/2097* (2013.01); *D07B 2401/2025* (2013.01)

(58) Field of Classification Search
CPC ...... D07B 2201/201; D07B 2201/2015; D07B 1/04; D07B 1/0613
USPC .................................................. 57/213, 223
See application file for complete search history.

(56) References Cited

U.S. PATENT DOCUMENTS

| | | | |
|---|---|---|---|
| 6,420,488 B1* | 7/2002 | Penot | C08K 5/17 252/183.14 |
| 8,191,348 B2* | 6/2012 | Barguet | B60C 9/0007 57/223 |
| 2009/0266461 A1 | 10/2009 | Mukai et al. | |
| 2011/0263761 A1* | 10/2011 | Matsuda | B60C 1/00 524/91 |
| 2012/0174557 A1 | 7/2012 | Boisseau et al. | |

FOREIGN PATENT DOCUMENTS

JP    2012-531540    12/2012
WO   WO 2005/071157   8/2005

OTHER PUBLICATIONS

Office Action dated Feb. 26, 2018 which issued in the corresponding Japanese Patent Application No. 2016-572665.

* cited by examiner

CABLE GUMMED IN SITU AND CONTAINING A GUMMING COMPOSITION THAT CONTAINS A CORROSION INHIBITOR

RELATED APPLICATIONS

This is a U.S. National Phase Application under 35 USC 371 of International Application PCT/EP2015/063017 filed on Jun. 11, 2015.

This application claims the priority of French application no. 1455343 filed Jun. 12, 2014, the entire content of which is hereby incorporated by reference.

FIELD OF THE INVENTION

The invention relates to a single-strand cord rubberized in situ, to a multistrand rope rubberized in situ and to the use of such cords/ropes for the reinforcing of a semi-finished product made of rubber and to a tire comprising such cords/ropes.

BACKGROUND OF THE INVENTION

A radial tire comprises in a known way a tread, two inextensible beads, two sidewalls connecting the beads to the tread and a belt or crown reinforcement positioned circumferentially between the carcass reinforcement and the tread. The carcass and/or crown reinforcement is composed, in a known way, of at least one ply (or "layer") of rubber reinforced with reinforcer elements, such as cords, generally of the metal type in the case of tires for industrial vehicles carrying heavy loads.

Use is generally made, for the reinforcing of carcass and/or crown reinforcements, of single-strand metal cords composed of a central layer or core and of one or more layers of concentric threads positioned around this core. The most widely used three-layer cords are essentially cords of M+N+P construction, formed of a core of M thread(s), M varying from 1 to 4, surrounded by an intermediate layer of N threads, N typically varying from 3 to 12, itself surrounded by an external layer of P threads, P typically varying from 8 to 20, it being possible for the assembly to be optionally wrapped by an external wrapping wire wound helically around the external layer. Use is also made of multistrand metal ropes comprising several strands, as described above.

In a well-known way, these metal cords are subjected, in particular in the case of the carcass reinforcement, to high stresses during the running of the tires, in particular to repeated bending actions or variations in curvature, resulting in rubbing actions at the threads, in particular as a result of the contacts between adjacent layers, and thus in wear, and also in fatigue; they thus have to exhibit high resistance to the "fretting fatigue" phenomena.

As regards the crown reinforcement, a tire of a heavy industrial vehicle, in particular a civil engineering vehicle, is subjected to numerous attacks. Specifically, this type of tire usually runs on an uneven road surface, sometimes resulting in perforations of the tread. These perforations allow the entry of corrosive agents, for example air and water, which oxidize the metal reinforcer elements of the crown reinforcement, in particular crown plies, and considerably reduce the lifetime of the tire.

In addition, it is particularly important for the reinforcer elements to be impregnated as much as possible with rubber and for this material to penetrate into all the spaces located between the threads and/or the strands constituting the cords. This is because, if this penetration is inadequate, empty channels or capillaries are then formed, along and inside the cords, and the corrosive agents, such as water or even oxygen of the air, liable to penetrate into the tires, for example as a result of cuts to their treads, make their way along these empty channels. The presence of this moisture plays an important role by bringing about corrosion and by accelerating the degradation processes above (phenomena referred to as "corrosion fatigue" and crown attack), in comparison with use in a dry atmosphere.

All these phenomena of fatigue and of attacks are the cause of a progressive deterioration in the mechanical properties of the cords and can affect, for the most severe running conditions, the lifetime of the cords.

In order to overcome the above disadvantages, Application WO 2005/071157 provided three-layer cords of 1+M+N construction, in particular of 1+6+12 construction, one of the essential characteristics of which is that a sheath composed of a rubber composition, referred to as rubberizing composition, covers at least the intermediate layer composed of the M threads, it being possible for the core (or individual thread) of the cord to be itself covered or not covered with rubber. By virtue of this specific architecture, the cord exhibits excellent properties of endurance in fretting fatigue and of resistance to attacks which are in particular improved with respect to the cords of the prior art. The longevity of the tires and that of their carcass and/or crown reinforcements are thus very substantially improved.

However, despite the presence of the rubberizing composition between the threads, during the use of the tire, corrosive agents, for example water, can penetrate into the reinforcements, in contact with the metal reinforcer elements, and can corrode them via external strands and/or threads, thus rapidly degrading their mechanical properties and properties of adhesion to the rubber composition adjacent to these metal reinforcer elements, known as calendering composition.

The use of a corrosion inhibitor makes it possible, on the one hand, to prevent the action of the corrosive agents by virtue of the formation of a protective film around the metal reinforcer element and, on the other hand, by adsorption on the metal reinforcer element, to slow down, indeed even to halt, the corrosive action of the corrosive agents on and within the metal reinforcer element.

A composition comprising a derivative of the family of the triazines as corrosion inhibitor is known from the document JP05177772. However, such a compound is relatively expensive. Furthermore, it is desirable to limit as much as possible the amount to be employed of compounds which may have an environmental impact.

SUMMARY OF THE INVENTION

One object of the invention to provide a cord rubberized in situ with a rubberizing rubber composition comprising an effective and environmentally neutral corrosion inhibitor.

To this end, one aspect of the present invention is directed to a single-strand cord rubberized in situ comprising:

an internal layer of the cord comprising N1 internal thread(s), an external layer of the cord comprising N3 external threads wound helically around the internal layer of the cord, a rubber composition positioned between the internal layer of the cord and the external layer of the cord, notable in that the rubber composition comprises a compound of formula (I) or a salt of this compound:

(I)

in which:
each R1, R2 and R3 group represents, independently of one another, an alkylene, arylene, arylalkylene, alkylarylene or cycloalkylene group, each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and $X_3$ comprises at least one —COOH, —CO—NH—OH, —SOOH, —PO(OR)(R') or —PO(OR)(OR') group with R and R' representing, independently of each other, hydrogen or an alkyl group.

Advantageously, the rubberizing rubber composition according to the invention makes it possible to reduce, indeed even to eliminate, the risk of corrosion of the metal cord. Furthermore, the fact of adding a compound of formula (I) to the rubber composition positioned between the internal layer of the cord and the external layer of the cord makes it possible to reduce the amount of compound while obtaining a similar, indeed even better, corrosion-inhibiting effect than when said compound is positioned in the adjacent calendering rubber composition.

On the one hand, the compounds of formula (I) or a salt of this compound capture the corrosive agents before they reach the threads protected by the rubberizing composition.

On the other hand, the composition also makes it possible to limit the corrosive action of the corrosive agents on the threads. This is because it is assumed that the compounds of formula (I) or a salt of this compound are transported by the corrosive agent, for example water, as far as the threads, where they are adsorbed on an external surface of the threads which the rubberizing composition protects and block the action of the corrosive agents.

The compounds of formula (I) or a salt of this compound are relatively neutral with regard to the environment.

The rubber composition can occur in the raw or vulcanized form.

In a preferred embodiment, the threads are coated with a layer of copper or brass which, inter alia, makes it possible to improve the adhesion of the rubber to the thread by sulphurization of this layer during the curing. The compounds of formula (I) or a salt of this compound do not inhibit this sulphurization and thus do not interfere with the adhesion between the metal reinforcer element and the rubber composition.

The single-strand cord rubberized in situ according to an embodiment of the invention can also comprise one or more of the characteristics below, considered individually or according to all the combinations technically possible:

$X_3$ represents —COOH, —CO—NH—OH, —SOOH, —PO(OR)(R') or —PO(OR)(OR') with R and R' representing, independently of each other, hydrogen or an alkyl group; and/or R1=R2; and/or R1 and R2 represent an alkylene group, preferably a methylene group; and/or R1=R2=R3; and/or R1, R2 and R3 represent an alkylene group, preferably a methylene group; and/or $X_1=X_2$; and/or $X_1$ and $X_2$ represent a —PO(OR)(R') group with R and R' representing, independently of each other, hydrogen or an alkyl group, preferably —PO$_3$H; and/or $X_3$ comprises at least one —COOH group; and/or $X_3$ represents —COOH.

Advantageously, the compound of formula (I) is N,N-bis(phosphonomethyl)glycine.

Other compounds of formula (I) or salts of these compounds can be used, for example ethylenediaminetetra(methylenephosphonic acid) (abbreviated to "EDTMP") or else diethylenetriaminepenta(methylenephosphonic acid) (abbreviated to "DTPMP").

Preferably, the composition comprises at least 0.1 phr, limit included, of the compound of formula (I) and/or salts of this compound.

Preferably, the composition comprises at most 2 phr, limit included, preferably at most 1 phr, limit included, and more preferably at most 0.7 phr, limit included, of the compound of formula (I) and/or salt of this compound.

In one embodiment, the rubber composition is present in each of the capillaries located between the N1 internal thread(s) of the internal layer and the N3 external threads of the external layer.

In another embodiment, the cord additionally comprises an intermediate layer of the cord comprising N2 intermediate threads wound helically around the internal layer of the cord, the N3 external threads of the external layer of the cord being wound helically around the intermediate layer of the cord.

Preferably, the rubber composition is present in each of the capillaries located between the N1 internal thread(s) of the internal layer and the N2 intermediate threads of the intermediate layer.

More preferably still, the rubber composition is present in each of the capillaries located between the N2 intermediate threads of the intermediate layer and the N3 external threads of the external layer.

Another aspect of the invention relates to a multistrand rope rubberized in situ, comprising at least one strand which is a single-strand cord rubberized in situ according to an embodiment of the invention.

In a preferred embodiment, the multistrand rope rubberized in situ comprises:

an internal layer of the rope comprising T1 internal strand(s), an external layer of the rope comprising T2 external strands wound helically around the internal layer of the rope, at least one of the internal and/or external strands being a single-strand cord rubberized in situ according to the invention.

The multistrand rope rubberized in situ can also comprise one or more of the characteristics below, considered individually or according to all the combinations technically possible:

each external strand is a single-strand cord rubberized in situ according to the invention; and/or each internal strand is a single-strand cord rubberized in situ according to the invention; and/or the multistrand rope comprises a rubber composition positioned between the internal layer of the T1 internal strand(s) of the rope and the external layer of the T2 external strands of the rope, the rubber composition comprising a compound of formula (I) or a salt of this compound:

in which:
each R1, R2 and R3 group represents, independently of one another, an alkylene, arylene, arylalkylene, alkylarylene or cycloalkylene group,
each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and
$X_3$ comprises at least one —COOH, —CO—NH—OH, —SOOH, —PO(OR)(R') or —PO(OR)(OR') group with R and R' representing, independently of each other, hydrogen or an alkyl group.

Another aspect of the invention relates to a multistrand rope rubberized in situ comprising:
an internal layer of the rope comprising T1 internal strand(s),
an external layer of the rope comprising T2 external strands wound helically around the internal layer of the rope,
a rubber composition positioned between the internal layer of the rope and the external layer of the rope, the rubber composition comprising a compound of formula (I) or a salt of this compound:

in which:
each R1, R2 and R3 group represents, independently of one another, an alkylene, arylene, arylalkylene, alkylarylene or cycloalkylene group,
each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and
$X_3$ comprises at least one —COOH, —CO—NH—OH, —SOOH, —PO(OR)(R') or —PO(OR)(OR') group with R and R' representing, independently of each other, hydrogen or an alkyl group.

The advantages touched on above for the single-strand cord rubberized in situ apply mutatis mutandis to the multistrand ropes described above.

Another aspect of the invention relates to the use of a single-strand cord rubberized in situ according to the invention or of a multistrand rope rubberized in situ according to an embodiment of the invention for the reinforcing of a semi-finished product or article made of rubber, for example a tire.

Another aspect of the invention relates to a tire comprising a single-strand cord rubberized in situ according to an embodiment of the invention or to a multistrand rope rubberized in situ according to an embodiment of the invention.

BRIEF DESCRIPTION OF THE DRAWINGS

A better understanding of the invention will be obtained on reading the description which will follow, given as non-limiting example of the implementation of the invention, and on examining the appended figures, in which.

DETAILED DESCRIPTION OF THE DRAWINGS

In the present description, unless expressly indicated otherwise, all the percentages (%) given are % by weight. The acronym "phr" signifies parts by weight per hundred parts of solid elastomer.

Moreover, cord rubberized in situ is understood to mean, within the meaning of the invention, a cord rubberized from the inside, during its actual manufacture, thus in the raw manufacturing state, with a "rubberizing" rubber composition. In other words, at least one of the capillaries or gaps (the two interchangeable terms denoting the voids or empty spaces in the absence of filling rubber) formed by the adjacent threads or strands is at least partially filled (continuously or non-continuously along the axis of the cord) with the rubberizing composition so that, for each length of cord of 2 cm, each capillary comprises at least one plug of rubber.

The invention relates to a single-strand cord rubberized in situ C comprising at least one internal layer of the cord CT1 and one external layer of the cord CT3. The internal layer of the cord CT1 comprises N1 internal thread(s) with N1 greater than or equal to 1. The external layer of the cord CT3 comprises N3 external threads wound helically around the internal layer of the cord CT1.

In particular, the internal layer CT1 can comprise one or more threads (i.e., N1 varies from 1 to 3). The external layer CT3 can comprise from ten to fourteen threads (i.e., N3 varies from 5 to 7).

The cord according to the invention is rubberized in situ and thus comprises a "rubberizing" rubber composition 20 positioned between the internal layer of the cord CT1 and the external layer of the cord CT3.

The rubber (or without distinction "the elastomer", both being regarded as synonyms) of the rubberizing composition is preferably a diene elastomer, that is to say, by definition, an elastomer resulting, at least in part (that is to say, a homopolymer or a copolymer), from diene monomer(s) (i.e., monomer(s) bearing two conjugated or non-conjugated carbon-carbon double bonds).

Particularly preferably, the diene elastomer of the composition is selected from the group of diene elastomers consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/stirene copolymers (SBRs), isoprene/butadiene copolymers (BIRs), isoprene/stirene copolymers (SIRs), isoprene/butadiene/stirene copolymers (SBIRs) and the mixtures of such copolymers.

The compositions can comprise just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Preferably, the composition comprises a reinforcing filler.

When a reinforcing filler is used, use may be made of any type of reinforcing filler known for its abilities to reinforce a rubber composition which can be used for the manufacture of tires, for example an organic filler, such as carbon black, a reinforcing inorganic filler, such as silica, or also a blend of these two types of filler, in particular a blend of carbon black and silica.

All the carbon blacks conventionally used in tires ("tire-grade" blacks) are suitable as carbon blacks. Mention will more particularly be made, for example, of the reinforcing carbon blacks of the 100, 200 or 300 series (ASTM grades).

"Reinforcing inorganic filler" should be understood, in the present patent application, by definition, as meaning any inorganic or mineral filler, whatever its colour and its origin (natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black. Such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16387.

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

A person skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to form the bond between the filler and the elastomer.

The content of total reinforcing filler (carbon black and/or reinforcing inorganic filler, such as silica) is within a range from 5 to 120 phr, limits included, more preferably from 5 to 70 phr, limits included, and more preferably also from 5 to 60 phr, limits included.

Of course, it is possible to use just one carbon black or a blend of several carbon blacks of different ASTM grades. The carbon black can also be used as a blend with other reinforcing fillers and in particular reinforcing inorganic fillers as described above, in particular silica. Use can thus be made of just one silica or a blend of several different silicas.

When an inorganic filler (for example silica) is used in the composition, alone or as a blend with carbon black, its content is within a range from 0 to 70 phr, limits included, preferably from 0 to 60 phr, limits included, in particular also from 5 to 70 phr, limits included, and more preferably still this proportion varies from 5 to 60 phr, limits included.

Preferably, the rubberizing composition comprises a reinforcing filler predominantly comprising silica by weight and more preferably comprising solely silica. Predominantly is understood to mean that the proportion by weight of silica is greater than the proportion by weight of the remainder of the other reinforcing fillers of the composition, whether these fillers are organic, such as, for example, carbon black, or inorganic.

Advantageously, the rubberizing composition comprises at least 30 phr, limit included, and preferably at least 40 phr, limit included, of silica.

Preferably, the rubberizing composition comprises various additives.

The rubberizing compositions can also comprise all or a portion of the usual additives generally used in elastomer compositions intended for the manufacture of tires, such as, for example, plasticizers or extending oils, whether the latter are of aromatic or non-aromatic nature, pigments, protection agents, such as antioxidants, anti-fatigue agents, reinforcing resins, such as bismaleimides, methylene acceptors (for example, phenolic novolak resin) or methylene donors (for example, HMT or H3M).

As presented above, the rubberizing composition comprises a corrosion inhibitor in accordance with the formula (I):

in which:

each R1, R2 and R3 group represents, independently of one another, an alkylene, arylene, arylalkylene, alkylarylene or cycloalkylene group, each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and $X_3$ comprises at least one —COOH, —CO—NH—OH, —SOOH, —PO(OR)(R') or —PO(OR)(OR') group with R and R' representing, independently of each other, hydrogen or an alkyl group.

Preferably, $X_3$ represents —COOH, —CO—NH—OH, —SOOH, —PO(OR)(R') or —PO(OR)(OR') with R and R' representing, independently of each other, hydrogen or an alkyl group.

In one embodiment, R1 and R2 are identical.

In the case where R1 and R2 are identical, they can represent an alkylene group, preferably a methylene group.

In one embodiment, R1, R2 and R3 are identical.

In the case where R1, R2 and R3 are identical, they can represent an alkylene group, preferably a methylene group.

In one embodiment, $X_1$ and $X_2$ are identical.

In the case where $X_1$ and $X_2$ are identical, they can represent a —PO(OR)(R') group with R and R' representing, independently of each other, hydrogen or an alkyl group, preferably —PO$_3$H.

In one embodiment, $X_3$ comprises at least one —COOH group, for example $X_3$ represents —COOH.

Preferably, the composition comprises at least 0.1 phr, limit included, of the compound of formula (I) and/or salts of this compound.

Preferably, the composition comprises at most 2 phr, limit included, preferably at most 1 phr, limit included, and more preferably at most 0.7 phr, limit included, of the compound of formula (I) and/or salt of this compound.

Preferably, the rubberizing composition comprises a crosslinking system, more preferably a vulcanization system.

The crosslinking system, in this instance the vulcanization system, comprises sulphur-donating agents, for example sulphur.

Preferably, the vulcanization system comprises vulcanization activators, such as zinc oxide and stearic acid.

Preferably, the vulcanization system comprises an accelerator.

Advantageously, the accelerator is chosen from tetrabenzylthiuram disulphide (abbreviated to "TBZTD") and the family of the sulphenamides consisting of 2-mercaptobenzothiazole disulphide (abbreviated to "MBTS"), N-cyclohexyl-2-benzothiazolesulphenamide (abbreviated to "CBS"), N, N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI") and the mixtures of these compounds.

Optionally, the vulcanization system also comprises a vulcanization retarder, such as N-(cyclohexylthio)phthalimide (abbreviated to "CTP").

The sulphur or sulphur-donating agent is used at a preferred content of between 0.5 and 10 phr, limits included, more preferably of between 0.5 and 8.0 phr, limits included, and very preferably between 2.0 and 8.0 phr, limits included. The combined vulcanization accelerators, retarders and activators are used at a preferred content of between 0.5 and 15 phr, limits included. The vulcanization activator or activators is or are used at a preferred content of between 0.5 and 10 phr, limits included.

In an alternative form, it will be possible to envisage dispensing with the crosslinking system, that is to say to have available a rubberizing composition devoid of sulphur-donating agents, for example sulphur, and of vulcanization activators, such as zinc oxide and stearic acid.

Composition devoid of a compound is understood to mean that the composition does not comprise this compound deliberately introduced into the composition and that this compound, if it is present, is present in the form of traces related, for example, to the process for the manufacture of the composition. For example, the composition devoid of a compound comprises the latter in an amount of less than or equal to 0.1 phr and preferably of less than or equal to 0.05 phr.

Figure 1:
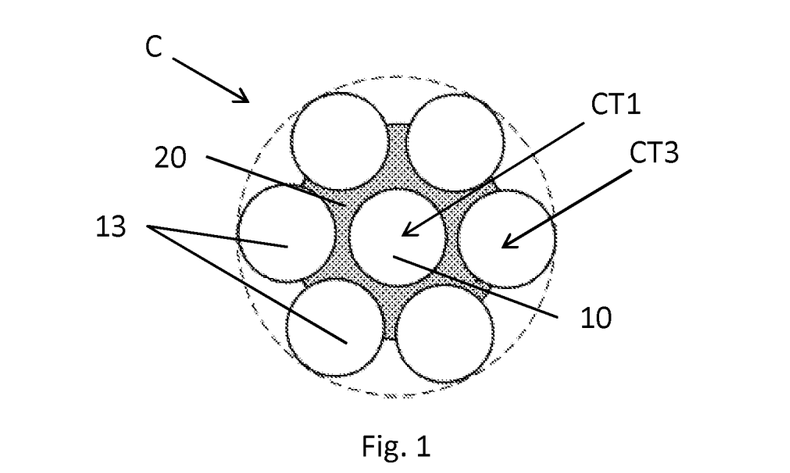
FIG. 1 is a diagrammatic representation of a cross-section of a single-strand cord of 1+6 construction, rubberized in situ, according to an embodiment of the invention.

According to a first embodiment represented in FIG. 1 of a single-strand cord rubberized in situ C comprising two layers, the internal layer CT1 of the single-strand core rubberized in situ C comprises an internal thread 10 and the external layer of the cord CT3 comprises six external threads 13 wound helically around the internal thread.

Preferably, the rubber composition 20 is present in each of the capillaries or gaps located between the internal thread of the internal layer CT1 and the six external threads of the external layer CT3.

Although not represented, it is possible to provide two-layer cords with, for example, three internal threads and nine external threads.

Figure 2:
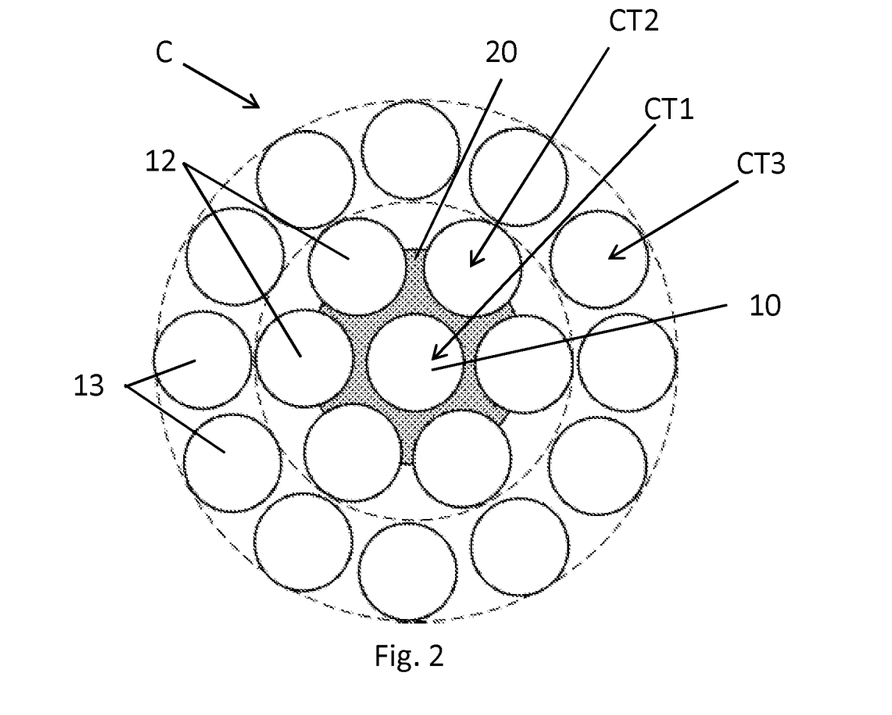
FIGS. 2 to 4 are diagrammatic representations of cross-sections of single-strand cords of 1+6+12 construction, rubberized in situ, according to different embodiments of the invention.
Figure 3:
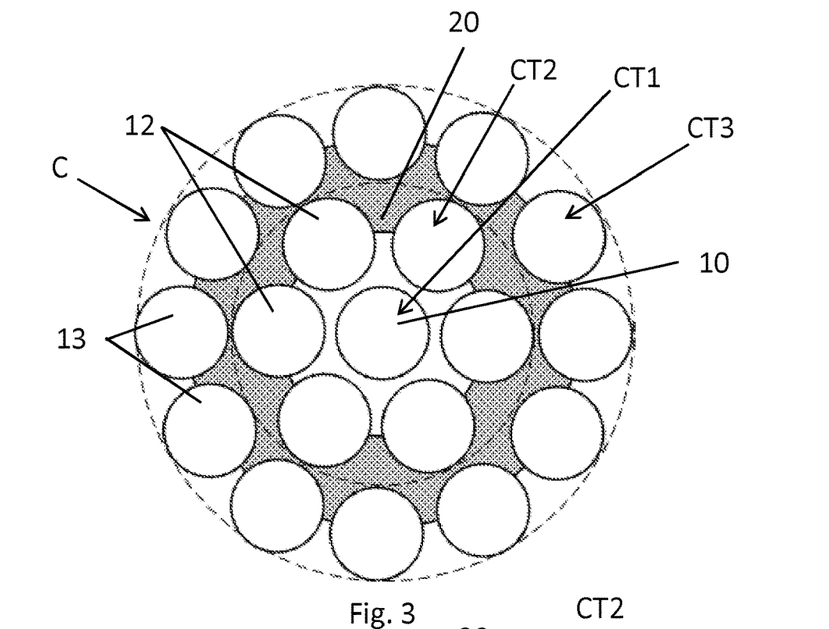
Figure 4:
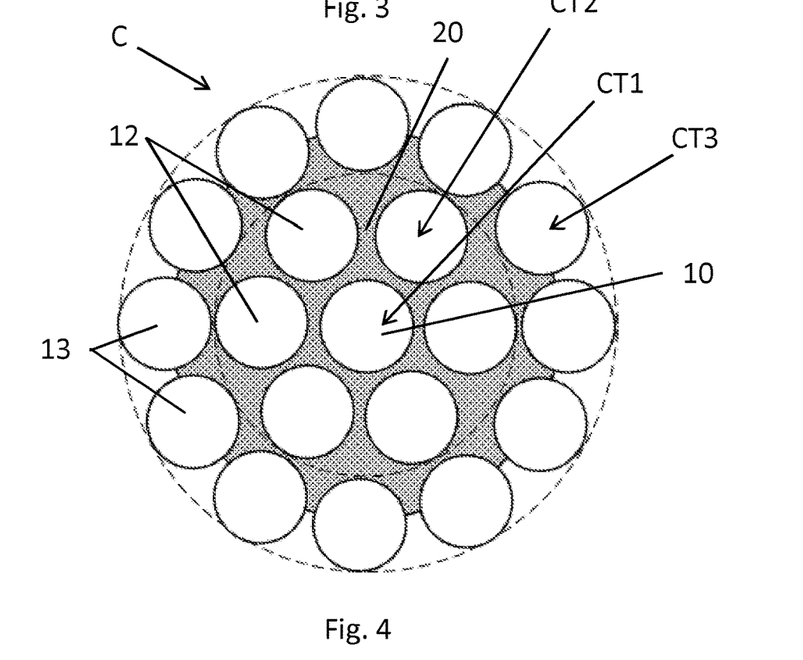

According to embodiments illustrated in FIGS. 2 to 4 of single-strand cords rubberized in situ comprising three layers, the single-strand cord rubberized in situ according to the invention C can comprise an intermediate layer of the cord CT2 comprising N2 intermediate threads. The N2 intermediate threads are wound helically around the internal layer CT1 of the cord and the N3 external threads of the external layer CT3 of the cord are wound helically around the intermediate layer CT2 of the cord.

In the embodiments illustrated in FIGS. 2 to 4, the internal layer CT1 comprises an internal thread 10, the intermediate layer CT2 comprises six intermediate threads 12 and the external layer CT3 comprises twelve external threads 13. The cords of FIGS. 2 to 4 exhibit a 1+6+12 construction.

The invention is not limited to the configuration illustrated in FIGS. 2 to 4.

In particular, the internal layer CT1 can comprise more threads, for example two or three threads assembled together (i.e., N1 varies from 1 to 3).

In addition, the intermediate layer CT2 can comprise from five to seven threads (i.e., N2 varies from 5 to 7).

Finally, the external layer CT3 can comprise from ten to fourteen threads (i.e., N3 varies from 10 to 14).

According to the embodiment represented in FIG. 2, the rubberizing rubber composition 20 is present in each of the capillaries located between the internal thread 10 of the internal layer CT1 and the six intermediate threads 12 of the intermediate layer CT2.

Advantageously, such a configuration makes it possible to ensure good protection against corrosion of the internal and intermediate threads.

According to the embodiment represented in FIG. 3, the rubberizing rubber composition 20 is present in each of the capillaries located between the six intermediate threads 12 of the intermediate layer CT2 and the twelve external threads 13 of the external layer CT3.

Advantageously, such a configuration makes it possible to ensure good protection against corrosion of the intermediate and external threads. The rubberizing composition thus makes it possible to form a protective corrosion-inhibiting barrier between the core of the cord and the exterior.

As represented in FIG. 4, it is also possible to provide for the rubberizing rubber composition 20 to be present in each of the capillaries located between the internal thread 10 of the internal layer CT1 and the six intermediate threads 12 of the intermediate layer CT2 and in each of the capillaries located between the six intermediate threads 12 of the intermediate layer CT2 and the twelve external threads 13 of the external layer CT3.

Advantageously, such a configuration makes it possible to provide maximum protection against corrosion of the different layers of the cord.

The invention also relates to a multistrand rope rubberized in situ C' comprising at least one internal layer of the rope CCI and one external layer of the rope.

The internal layer of the rope CCI comprises T1 internal strand(s).

The external layer of the rope CCE comprises T2 external strands wound helically around the internal layer CCI of the rope C'.

Each internal strand TI and external strand TE is a single-strand cord comprising at least one internal layer of the cord CT1 and one external layer of the cord CT3. The internal layer comprises N1 internal thread(s) and the external layer comprises N3 external threads wound helically around the internal layer of the cord.

In the embodiments of multistrand ropes rubberized in situ C' represented in FIGS. 5 to 10, each internal strand TI and external strand TE is a single-strand cord comprising an intermediate layer CT2. The intermediate layer of the cord CT2 comprises N2 intermediate threads wound helically around the internal layer CT1 of the cord, the N3 external threads of the external layer CT3 of the cord being wound helically around the intermediate layer CT2 of the cord.

The multistrand ropes C' according to the invention are not limited to ropes comprising strands having structures represented in FIGS. 5 to 10.

According to embodiments of the invention, exemplary embodiments of which are represented in FIGS. 5 to 9, at least one of the internal and/or external strands is a single-strand cord according to the invention, namely a single-strand cord rubberized in situ with a rubber composition comprising a compound of formula (I) or a salt of this compound:

in which:
each R1, R2 and R3 group represents, independently of one another, an alkylene, arylene, arylalkylene, alkylarylene or cycloalkylene group, each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and

$X_3$ comprises at least one —COOH, —CO—NH—OH, —SOOH, —PO(OR)(R') or —PO(OR)(OR') group with R and R' representing, independently of each other, hydrogen or an alkyl group.

Figure 5:
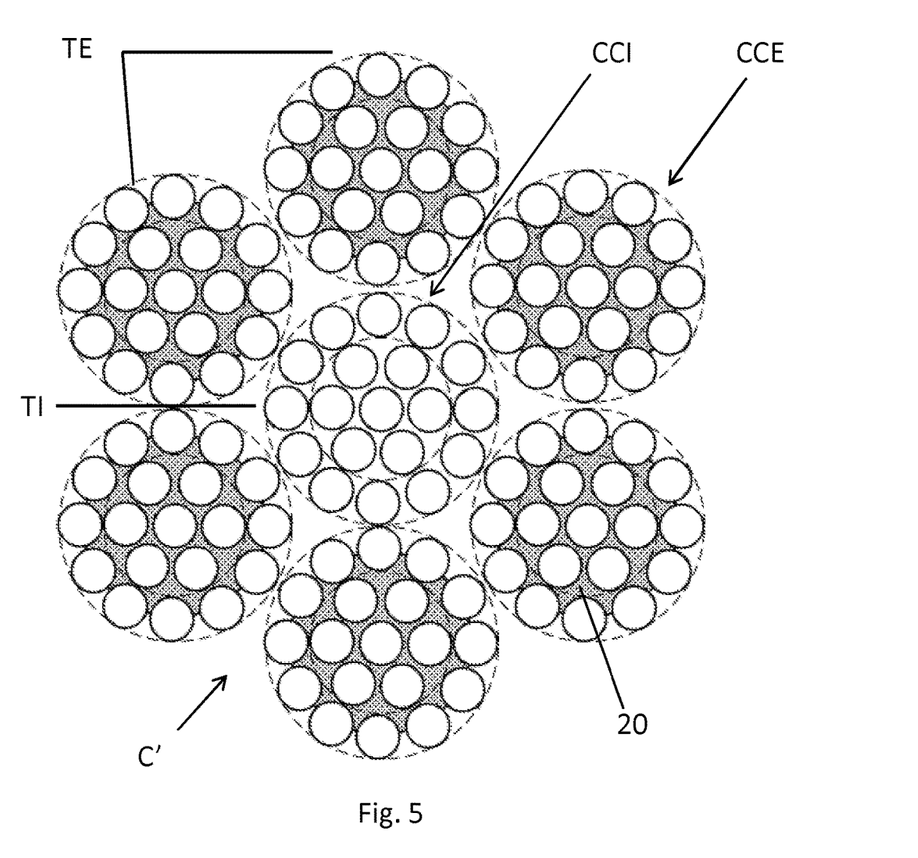
FIGS. 5 to 10 are diagrammatic representations of cross-sections of multistrand ropes of 1+6 construction, rubberized in situ, according to different embodiments of the invention and comprising several strands of 1+6+12 construction.

According to the embodiment represented in FIG. 5, each external strand TE is a single-strand cord rubberized in situ according to the invention, as described with reference to FIG. 4.

Figure 6:
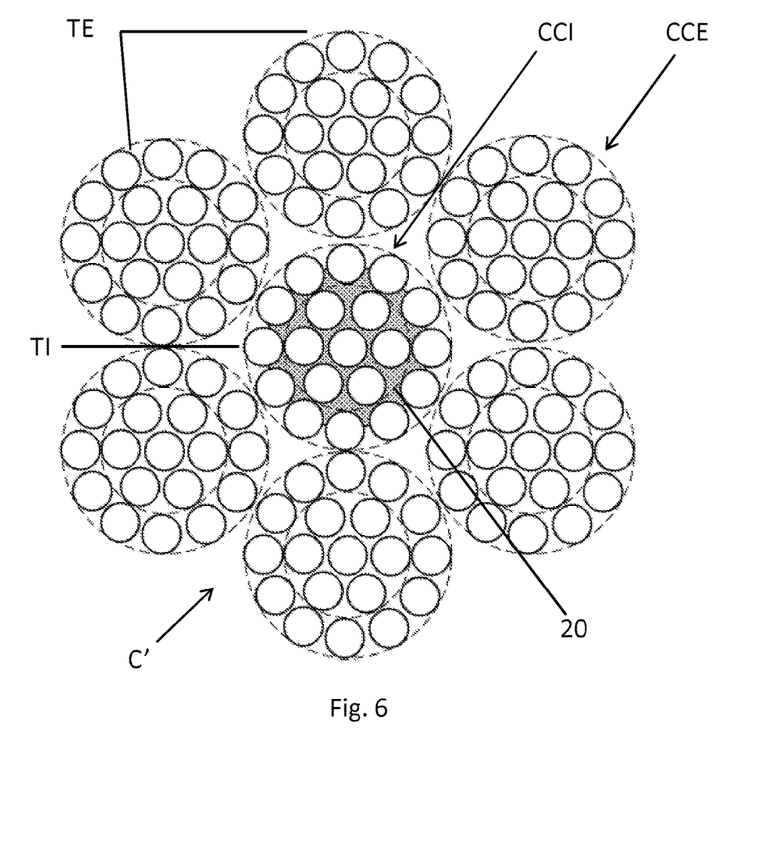

According to the embodiment represented in FIG. 6, each internal strand TI is a single-strand cord rubberized in situ according to the invention, as described with reference to FIG. 4.

Figure 7:
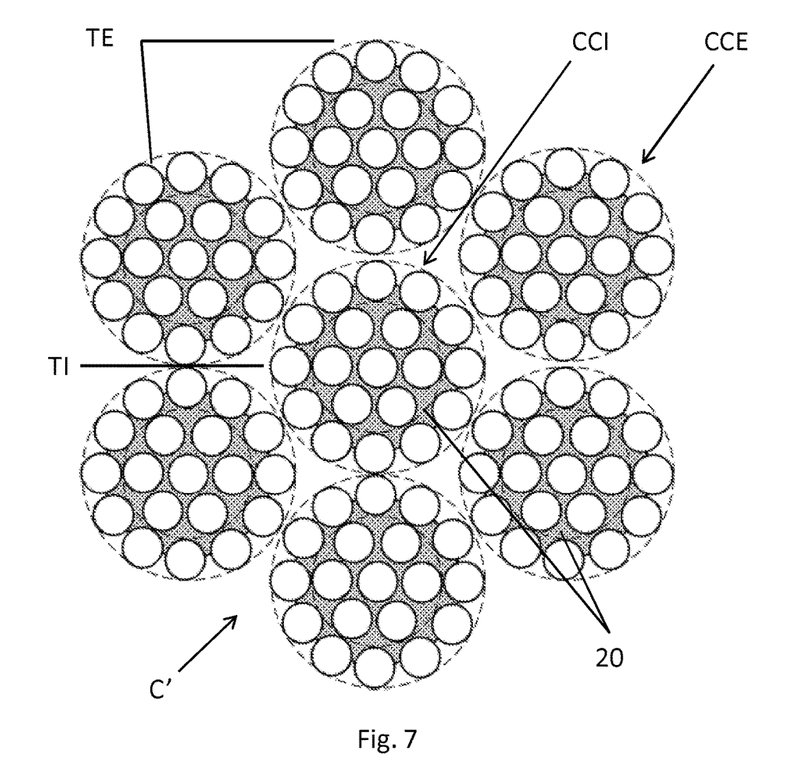

According to the embodiment represented in FIG. 7, each external strand TE and each internal strand TI is a single-strand cord rubberized in situ according to the invention, as described with reference to FIG. 4.

Figure 8:
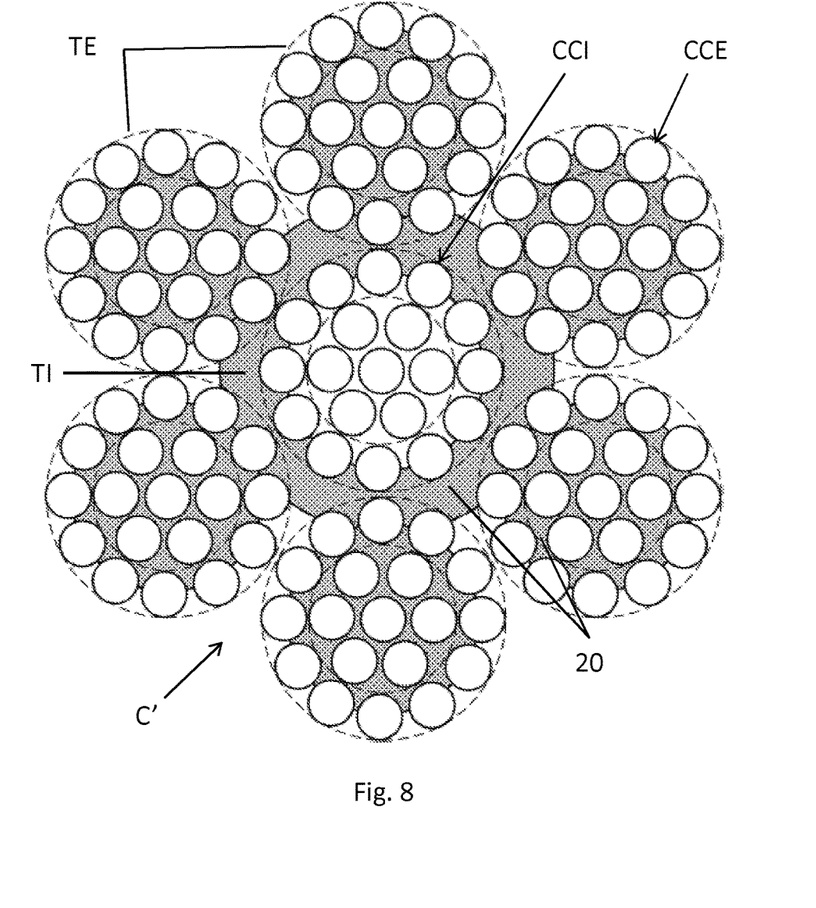
Figure 9:
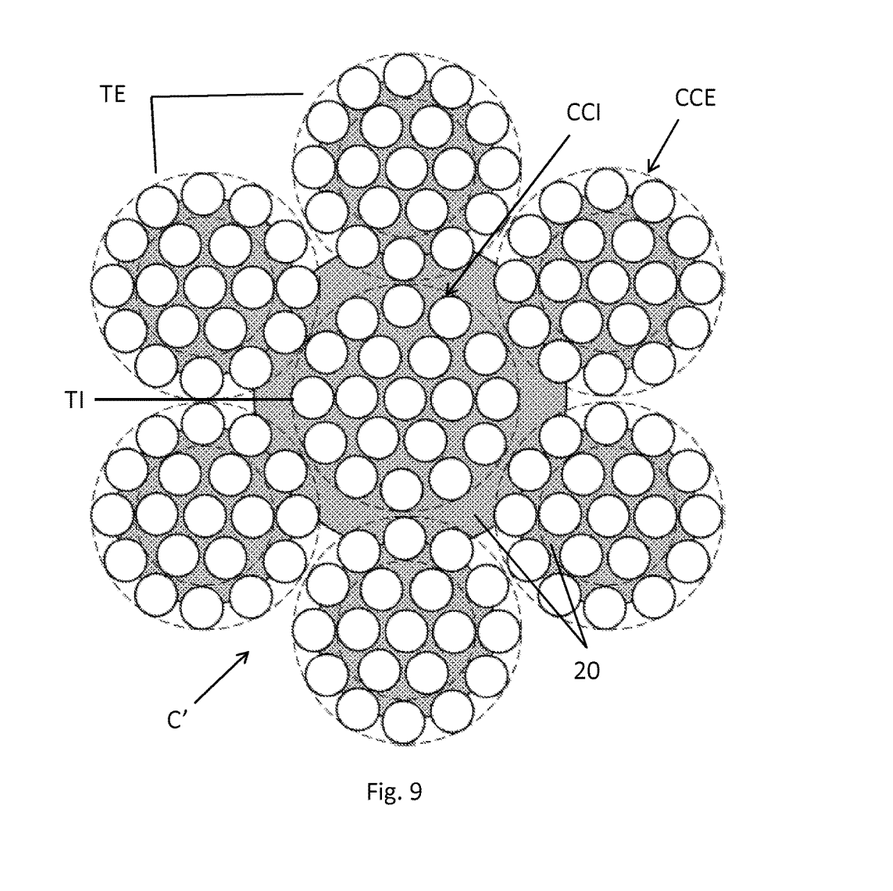

According to embodiments represented in FIGS. 8 and 9, the multistrand ropes according to the invention can comprise a rubberizing rubber composition 20 positioned between the internal layer CCI of the internal strand TI of the rope and the external layer CCE of the external strands TE of the rope, the rubberizing rubber composition 20 comprising a compound of formula (I) or a salt of this compound:

in which:
each R1, R2 and R3 group represents, independently of one another, an alkylene, arylene, arylalkylene, alkylarylene or cycloalkylene group, each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and

$X_3$ comprises at least one —COOH, —CO—NH—OH, —SOOH, —PO(OR)(R') or —PO(OR)(OR') group with R and R' representing, independently of each other, hydrogen or an alkyl group.

In these examples, the rubberizing rubber composition 20 is the same as that described above for the single-strand cords.

According to the embodiment represented in FIG. 8, each external strand TE is a single-strand cord rubberized in situ according to the invention, as described with reference to FIG. 4, the internal strand is a strand not rubberized in situ and a rubberizing rubber composition 20 comprising a compound of formula (I) or a salt of this compound is positioned between the internal layer of the rope CCI and the external layer of the rope CCE. In this example, the rubberizing rubber composition 20 positioned between the internal layer of the rope CCI and the external layer of the rope CCE is the same as that described above for the single-strand cords.

According to the embodiment represented in FIG. 9, each external strand TE and each internal strand TI is a single-strand cord rubberized in situ according to the invention and a rubberizing rubber composition 20 comprising a compound of formula (I) or a salt of this compound is positioned between the internal layer of the rope CCI and the external layer of the rope CCE. In this example, the rubberizing rubber composition 20 positioned between the internal layer of the rope CCI and the external layer of the rope CCE is the same as that described above for the single-strand cords.

The invention also relates to a multistrand rope rubberized in situ C' comprising at least:
an internal layer CCI of the rope comprising T1 internal strand(s) TI,
an external layer CCE of the rope comprising T2 external strands TE wound helically around the internal layer CCI of the rope,
a rubber composition positioned between the internal layer CCI of the rope and the external layer CCE of the rope, the rubber composition comprising a compound of formula (I) or a salt of this compound:

in which:
each R1, R2 and R3 group represents, independently of one another, an alkylene, arylene, arylalkylene, alkylarylene or cycloalkylene group, each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and $X_3$ comprises at least one —COOH, —CO—NH—OH, —SOOH, —PO(OR)(R') or —PO(OR)(OR') group with R and R' representing, independently of each other, hydrogen or an alkyl group.

Figure 10:
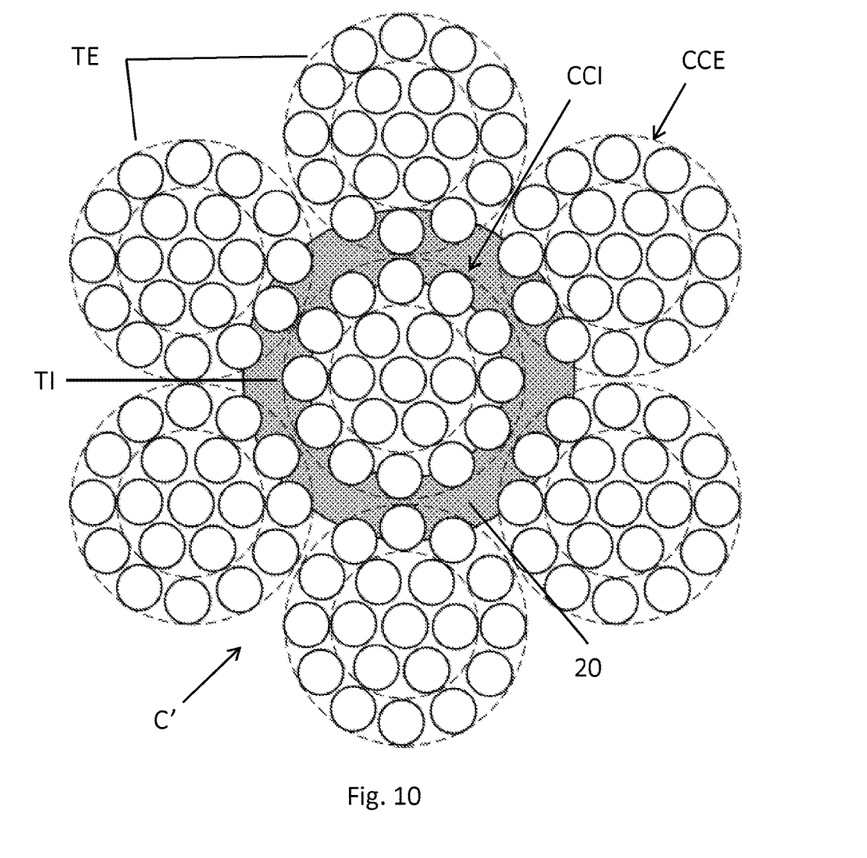

In the embodiment represented in FIG. 10, the strands are single-strand cords not rubberized in situ. A rubberizing rubber composition 20 comprising a compound of formula (I) or a salt of this compound is positioned between the internal layer of the rope CCI and the external layer of the rope CCE. Preferably, the rubberizing rubber composition 20 positioned between the internal layer of the rope CCI and the external layer of the rope CCE is the same as that described above for the single-strand cords.

The invention also relates to the use of a cord in accordance with the invention for the reinforcing of semi-finished products or articles made of plastic and/or of rubber, for example plies, pipes, belts, conveyer belts or tires, more particularly tires intended for industrial vehicles.

In order to manufacture the cords described above, the rubberizing rubber composition 20 is positioned in accordance with the general knowledge of a person skilled in the art during the assembling of the different layers of the cord. Reference is made in particular to the publications EP 1 699 973, WO2006/013077, WO2007/090603, WO09/083212, WO09/083213, WO10/012411, WO10/054790, WO10/054791, WO10/112444, WO10/112445, WO10/139583, WO11/000963, WO11/000964, WO11/000950 and WO11/000951.

The cord of the invention is very particularly intended to be used as reinforcing element intended for industrial vehicles chosen from vans, "heavy-duty" vehicles, i.e. underground, bus, heavy road transport vehicles (lorries, tractors, trailers) or off-road vehicles, heavy agricultural vehicles or earthmoving equipment, planes, and other transportation or handling vehicles.

The cord according to the invention can be used to reinforce different parts of tires, in particular carcass reinforcements or crown reinforcements of such tires, in particular of industrial tires, such as heavy-duty vehicle or earthmoving equipment tires.

The invention additionally relates to these semi-finished products or articles made of plastic and/or of rubber themselves when they are reinforced by a cord in accordance with the invention, in particular tires intended for the abovementioned industrial vehicles, more particularly heavy-duty or earthmoving equipment tires, and also to composite fabrics comprising a calendering rubber composition matrix reinforced with a cord rubberized in situ according to the invention, which can be used as carcass or crown reinforcement ply of such tires.

Comparative Tests

Two "Control 1" and "Control 2" compositions and an "Invention" composition as described above were compared. The "Control 1" composition is in accordance with the state of the art known to a person skilled in the art, that is to say devoid of corrosion inhibitor. The "Control 2" composition is identical to the "Control 1" composition except that it additionally comprises glycine.

The amounts of the components of the "Control 1", "Control 2" and "Invention" compositions are collated in Table 1 below and are expressed as parts per 100 parts by weight of elastomer (phr).

TABLE 1

| Composition | Control 1 | Control 2 | Invention |
| --- | --- | --- | --- |
| Diene elastomer | 100 | 100 | 100 |
| Carbon black | 4 | 4 | 4 |
| Silica | 40 | 40 | 40 |
| Antioxidant | 2 | 2 | 2 |
| Organosilane | 4 | 4 | 4 |
| ZnO | 8 | 8 | 8 |
| Stearic acid | 1 | 1 | 1 |
| Sulphur | 6 | 6 | 6 |
| Accelerator | 1 | 1 | 1 |
| Retarder | 0.2 | 0.2 | 0.2 |
| Glycine | 0 | 0.5 | 0 |
| Corrosion inhibitor | 0 | 0 | 0.5 |

Compositions Tested

The corrosion inhibitor of the "Invention" composition is in accordance with the formula (I). It is in the case in point N,N-bis(phosphonomethyl)glycine (abbreviated to "BPMG") of formula (II) below available from Sigma-Aldrich.

The "Invention" composition comprises at least 0.1 phr, limit included, and at most 2 phr, limit included, preferably at most 1 phr, limit included, and more preferably at most 0.7 phr, limit included, of the compound of formula (I) and/or salts of this compound, in this instance BPMG.

In the compositions of Table 1, the diene elastomer is natural rubber. The silica is a silica of HD type—Zeosil 1165MP from Rhodia. The carbon black is of the N330 type. The antioxidant is N-(1,3-dimethylbutyl)-N-phenyl-para-phenylenediamine (Santoflex 6-PPD from Flexsys). The organosilane is TESPT (Si69 from Degussa). The vulcanization accelerator is N-cyclohexyl-2-benzothiazolesulphenamide (Santocure CBS from Flexsys). The vulcanization retarder is N-(cyclohexylthio)phthalimide (CAS No. 17796-82-6).

Preparation of the Compositions Tested

The compositions are manufactured in appropriate mixers, using two successive phases of preparation well known to a person skilled in the art: a first phase of thermomechanical working or kneading (sometimes referred to as "non-productive" phase) at high temperature, up to a maximum temperature (denoted Tmax) of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the vulcanization system is incorporated. Such phases have been described, for example, in the abovementioned documents EP 501 227, EP 735 088, WO00/05300, WO00/05301 or WO02/083782.

By way of example, the first (non-productive) phase is carried out in a single thermomechanical stage during which, in a first step, all the base constituents necessary (diene elastomer, reinforcing inorganic filler, antioxidant, corrosion inhibitor and coupling agent) are introduced into an appropriate mixer, such as a standard internal mixer, followed, in a second step, for example after kneading for one to two minutes, by the optional additional processing aids and various other additives, with the exception of the vulcanization system. When the bulk density of the reinforcing inorganic filler is low (general case of silicas), it can be advantageous to split its introduction up into two or more parts. A second stage of thermomechanical working can be added to this internal mixer, after dropping the mixture and intermediate cooling (cooling temperature preferably of less than 100° C.), with the aim of subjecting the compositions to an additional thermomechanical treatment, in particular in order to further improve the dispersion, in the elastomeric matrix, of the reinforcing inorganic filler and of its coupling agent. The total duration of the kneading, in this non-productive phase, is preferably between 2 and 10 minutes.

After cooling the mixture thus obtained, the vulcanization system, if necessary, is then incorporated at low temperature, generally in an external mixer, such as an open mill; the combined mixture is then mixed (productive phase) for a few minutes, for example between 5 and 15 minutes.

The final composition thus obtained is subsequently calendered, for example in the form of a sheet or a plaque or also extruded, for example in order to form a rubber profiled element.

The vulcanization (or curing) is carried out in a known way at a temperature generally of between 130° C. and 200° C., preferably under pressure, for a sufficient time which can vary, for example, between 5 and 90 min, as a function in particular of the curing temperature, of the vulcanization system adopted, of the kinetics of vulcanization of the composition under consideration or of the size of the tire.

Adhesion Test

A tearing-out test in accordance with Standard ASTM D2229 is carried out on test specimens comprising metal cords of 2.30NF structure, a portion of which is inserted between two strips made of the rubber composition prepared and another portion of which is left free.

The force necessary to tear the cord out of the two rubber strips is measured. The measurement is carried out on 15 cords. The value retained is the mean of the measurements on these 15 cords. The greater the value of the force, the greater the adhesion between the cord and the rubber composition.

All the values are given in base 100 with respect to the "Control 1" composition. If, for the composition tested, the force necessary for the tearing out is greater than the force necessary for tearing the cords out of the test specimen using the "Control 1" composition, the adhesion of the cords to the rubber composition tested is better than that of the test specimen using the "Control 1" composition and thus the relative value retained is greater than 100 (the relative value of the test specimen using the "Control 1" composition is equal to 100). Conversely, if, for a given composition, the force necessary for the tearing out is lower than the force necessary for tearing the cords out of the test specimen using the "Control 1" composition, the adhesion of the cords to the rubber composition tested is poorer than that of the test specimen using the "Control 1" composition and thus the relative value retained is less than 100.

The adhesion test described above is carried out with test specimens vulcanized and/or aged under different conditions A, B, C and D.

Condition A (normal curing) corresponds to a test carried out on a test specimen cured for a period of time of less than 1 hour at a temperature of greater than 100° C.

Condition B (wet ageing in the raw state) corresponds to a test carried out on a test specimen comprising the raw composition and aged for several days at a temperature of greater than 30° C. and at more than 50% relative humidity.

Condition C (ageing under a corrosive atmosphere) corresponds to a test carried out on a test specimen comprising the raw composition and aged for several days in a NaCl solution.

Condition D (wet ageing in the cured state) corresponds to a test carried out on a test specimen cured for a period of time of less than 1 hour at a temperature of greater than 100° C. and aged for several days at a temperature of greater than 30° C. and at more than 50% relative humidity.

It will be understood that the greater the adhesion measured, the better is the corrosion-inhibiting performance of the rubberizing composition and thus the better are the properties of endurance in fatigue-fretting and of resistance to attacks on the tire comprising a cord comprising such a rubberizing composition.

The results of the adhesion test under the different conditions have been collated in Table 2 below.

TABLE 2

|   | Control 1 | Control 2 | Invention |
|---|---|---|---|
| A | 100 | 100 | 100 |
| B | 100 | 100 | 100 |
| C | 100 | 85 | 110 |
| D | 100 | 90 | 109 |

The "Invention" composition exhibits adhesion performances at least equivalent to the "Control 1" composition of the state of the art, whatever the test conditions, except under conditions C (ageing under a corrosive atmosphere) and D (wet ageing in the cured state), conditions for which the "Invention" composition exhibits adhesion properties which are superior to those of the "Control 1" composition of the state of the art. The "Invention" composition thus makes it possible to inhibit the corrosion created by the corrosive agents. The "Control 2" composition is not effective against corrosion.

Properties Before Curing

Mooney Plasticity

The Mooney plasticity is determined using a consistometer according to Standard ASTM D1646-99. The Mooney plasticity measurement is carried out according to the following principle: the mixture, generally raw, is moulded in a cylindrical chamber heated to a given temperature, usually 100° C. and in this instance 60° C. After preheating for one minute, a rotor of L type rotates within the test specimen at 2 revolutions per minute and the working torque for maintaining this movement is measured after rotating for 4 minutes. The Mooney plasticity (ML 1+4) is expressed in "Mooney unit" (MU, with 1 MU=0.83 newton.meter).

Properties after Curing
Tensile Tests

These tensile tests make it possible to determine the elasticity stresses and the properties at break of the rubber compositions. Unless otherwise indicated, they are carried out in accordance with French Standard NF T 46-002 of September 1988. The nominal secant modulus (or apparent stress, in MPa) is measured in second elongation (i.e., after an accommodation cycle at the extension rate provided for the measurement itself) at 10% elongation (denoted MA10), at 100% elongation (denoted MA100) and at 300% elongation (denoted MA300).

The results of the measurements of properties before and after curing of the different compositions have been collated in Table 3 below. The values of the different properties are shown in relative unit (R.U.) with respect to the values of the corresponding properties of the "Control 1" composition. When the value of the property is greater than 100, the value of the property is greater than that of the "Control 1" composition. Conversely, when the value of the property is less than 100, the value of the property is less than that of the "Control 1" composition.

TABLE 3

| Composition | Control 1 | Control 2 | Invention |
|---|---|---|---|
| Properties before curing | | | |
| Mooney (MU) | 100 | 100 | 98 |
| Properties after curing | | | |
| MA10 (MPa) | 100 | 100 | 94 |
| MA100 (MPa) | 100 | 100 | 103 |
| MA300 (MPa) | 100 | 100 | 104 |

The Mooney plasticity and the nominal secant moduli at 10%, 100% and 300% of the "Invention" composition are relatively unmodified with respect to those of the "Control 1" and "Control 2" compositions.

Of course, the invention is not restricted to the exemplary embodiments described above.

It will be possible to provide for the mixing of several corrosion inhibitors.

For example, some threads might have a non-circular section, for example a plastically deformed section, in particular a substantially oval or polygonal section, for example a triangular, square or also rectangular section.

The threads having a circular or non-circular section, for example a wavy thread, can be spiral, twisted into a helical shape or twisted into a zigzag shape. In such cases, it should, of course, be understood that the diameter of the thread represents the diameter of the imaginary cylinder of revolution which surrounds the thread (clearance diameter) and no longer the diameter (or any other transverse size, if its section is not circular) of the core thread itself.

For reasons of industrial feasibility, of cost and of overall performance, it is preferable to implement the invention with linear threads, that is to say straight threads, having a conventional circular cross-section.

It will also be possible to envisage a multistrand rope rubberized in situ in accordance with the invention and with a 1×N structure in which N represents the number of strands wound together helically.

It will also be possible to combine the characteristics of the various embodiments described or envisaged above, with the proviso that these characteristics are compatible with one another.

The invention claimed is:

1. A single-strand cord rubberized in situ comprising:
    an internal layer of the cord comprising N1 internal thread(s);
    an external layer of the cord comprising N3 external threads wound helically around the internal layer of the cord;
    a rubber composition positioned between the internal layer of the cord and the external layer of the cord;
    wherein the rubber composition comprises a compound of formula (I) or a salt of this compound:

(I)

wherein:
    each R1, R2 and R3 group represents, independently of one another, an alkylene, arylene, arylalkylene, alkylarylene or cycloalkylene group,
    each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and
    $X_3$ comprises at least one —COOH, —CO—NH—OH, —SOOH, —PO(OR)(R') or —PO(OR)(OR') group with R and R' representing, independently of each other, hydrogen or an alkyl group.

2. The single-strand cord rubberized in situ according to claim 1, wherein $X_3$ represents —COOH, —CO—NH—OH, —SOOH, —PO(OR)(R') or —PO(OR)(OR') with R and R' representing, independently of each other, hydrogen or an alkyl group.

3. The single-strand cord rubberized in situ according to claim 1, wherein R1=R2.

4. The single-strand cord rubberized in situ according to claim 3, wherein R1 and R2 represent an alkylene group.

5. The single-strand cord rubberized in situ according to claim 1, wherein R1=R2=R3.

6. The single-strand cord rubberized in situ according to claim 5, wherein R1, R2 and R3 represent an alkylene group.

7. The single-strand cord rubberized in situ according to claim 1, wherein $X_1=X_2$.

8. The single-strand cord rubberized in situ according to claim 7, wherein $X_1$ and $X_2$ represent a —PO(OR)(OR') group with R and R' representing, independently of each other, hydrogen or an alkyl group.

9. The single-strand cord rubberized in situ according to claim 1, wherein $X_3$ comprises at least one —COOH group.

10. The single-strand cord rubberized in situ according to claim 9, wherein $X_3$ represents —COOH.

11. The single-strand cord rubberized in situ according to claim 1, wherein the rubber composition is present in each of the capillaries located between the N1 internal thread(s) of the internal layer and the N3 external threads of the external layer.

12. The single-strand cord rubberized in situ according to claim 1, comprising an intermediate layer of the cord comprising N2 intermediate threads wound helically around the internal layer of the cord, the N3 external threads of the external layer of the cord being wound helically around the intermediate layer of the cord.

13. The single-strand cord rubberized in situ according to claim 12, wherein the rubber composition is present in each of the capillaries located between the N1 internal thread(s) of the internal layer and the N2 intermediate threads of the intermediate layer.

14. The single-strand cord rubberized in situ according to claim 12, wherein the rubber composition is present in each of the capillaries located between the N2 intermediate threads of the intermediate layer and the N3 external threads of the external layer.

15. A multistrand rope rubberized in situ, comprising at least one strand which is the single-strand cord rubberized in situ according to claim 1.

16. The multistrand rope rubberized in situ according to claim 15, comprising:
an internal layer of the rope comprising T1 internal strand(s);
an external layer of the rope comprising T2 external strands wound helically around the internal layer of the rope; and
at least one of the internal and/or external strands being said single-strand cord rubberized in situ.

17. The multistrand rope rubberized in situ according to claim 16, wherein each external strand is said single-strand cord rubberized in situ.

18. The multistrand rope rubberized in situ according to claim 16, wherein each internal strand is said single-strand cord rubberized in situ.

19. The multistrand rope rubberized in situ according to claim 16, comprising a rubber composition positioned between the internal layer of the T1 internal strand(s) of the rope and the external layer of the T2 external strands of the rope, the rubber composition comprising a compound of formula (I) or a salt of this compound:

(I)

wherein:
each R1, R2 and R3 group represents, independently of one another, an alkylene, arylene, arylalkylene, alkylarylene or cycloalkylene group,
each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and
$X_3$ comprises at least one —COOH, —CO—NH—OH, —SOOH, —PO(OR)(R') or —PO(OR)(OR') group with R and R' representing, independently of each other, hydrogen or an alkyl group.

20. A multistrand rope rubberized in situ, comprising:
an internal layer of the rope comprising T1 internal strand(s);
an external layer of the rope comprising T2 external strands wound helically around the internal layer of the rope;
a rubber composition positioned between the internal layer of the rope and the external layer of the rope, the rubber composition comprising a compound of formula (I) or a salt of this compound:

(I)

wherein:
each R1, R2 and R3 group represents, independently of one another, an alkylene, arylene, arylalkylene, alkylarylene or cycloalkylene group,
each $X_1$ and $X_2$ group represents, independently of each other, —COOH, —CO—NH—OH, —SOOH, —PO(OR)(R') or —PO(OR)(OR') with R and R' representing, independently of each other, hydrogen or an alkyl group, and
$X_3$ comprises at least one —COOH, —CO—NH—OH, —SOOH, —PO(OR)(R') or —PO(OR)(OR') group with R and R' representing, independently of each other, hydrogen or an alkyl group.

21. A tire comprising a single-strand cord rubberized in situ according to claim 1.

22. A tire comprising a multistrand rope rubberized in situ according to claim 15.

23. The single-strand cord rubberized in situ according to claim 3, wherein R1 and R2 represent a methylene group.

24. The single-strand cord rubberized in situ according to claim 5, wherein R1, R2 and R3 represent a methylene group.

25. The single-strand cord rubberized in situ according to claim 1, wherein $X_1$ and $X_2$ represent a —PO(OR)(OR') group with R and R' representing, independently of each other, hydrogen or —PO$_3$H.

* * * * *